Feb. 15, 1927.
W. H. KRIETE
POP CORN KETTLE
Filed Sept. 11, 1922
1,617,643
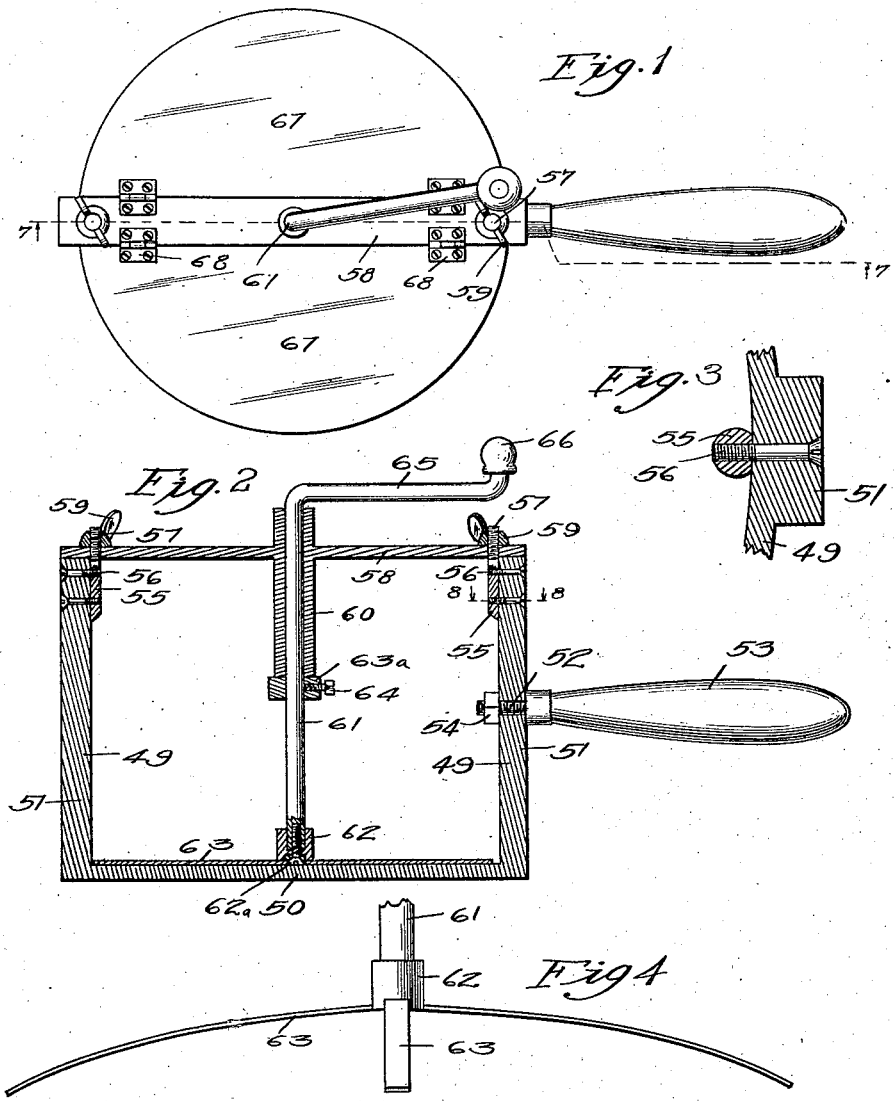
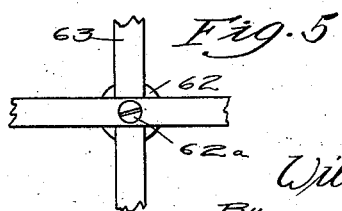
Inventor
William H. Kriete
By Bair & Freeman
Att'ys
Witness
Lynn Latta Patented Feb. 15, 1927.

1,617,643

UNITED STATES PATENT OFFICE.

WILLIAM H. KRIETE, OF DES MOINES, IOWA.

POP-CORN KETTLE.

Application filed September 11, 1922. Serial No. 587,349.

My invention contemplates the providing of a machine which is compact and of very simple construction, and designed to be used for popping corn.

A further object is to provide a cover member for the kettle which may be opened to place pop corn in the kettle.

My pop corn kettle has certain novel features, one of which is a stirring mechanism peculiarly adapted to fit very closely to the bottom of the kettle to prevent the burning of the corn.

More particularly, it is intended to provide a kettle which may be easily cleaned and which has, for the purpose, a removable top and stirring mechanism.

Still a further object is to provide a convenient and quickly operated means for securing the stirrer blades to the operating mechanism whereby they may be readily removed therefrom for cleaning purposes.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a plan view of my improved pop corn kettle.

Figure 2 is a central, longitudinal section through the same taken on the line 2—2 of Figure 1.

Figure 3 is a detail, sectional view taken on the line 3—3 of Figure 2.

Figure 4 is an enlarged detail of a stirring mechanism, and

Figure 5 is an inverted plan view of a portion of the same.

It has been my object to design a pop corn kettle which is as simple and inexpensive as possible in construction, and which will efficiently perform all of the functions required of such a device.

My structure is built so substantially that it is not easily injured by being transported from place to place, and it is so simple in construction that there is nothing to get out of order.

My improved kettle comprises a casing 49 having a flat bottom 50.

Vertical ribs 51 diametrically positioned extend from top to bottom of the sides. In one rib 51, an opening is provided through which is extended the threaded shank 52 of a handle 53. A nut 54 serves to hold the handle in place.

The stub bolts 55 are fastened to the interior of the kettle by means of screws 56 which extend through the ribs 51. The bolts 55 have the upwardly projecting screw threaded portions 57 which extend beyond the top of the kettle.

The bearing plate 58 has openings at either end so positioned as to fit over the projecting ends of the bolts 55. Wing nuts 59 serve to hold the plate 58 in place. At the center of the plate 58 is a comparatively long downwardly extending boss 60, which has its center bored to provide a bearing for the vertical stirrer shaft 61. The shaft 61 has at its lower end a block 62.

In the lower face of the block 62 are two grooves, one of which is slightly deeper than the other. These grooves extend across the face of the block 62 in directions perpendicular to each other.

The grooves are designed to receive the stirring fingers 63 which are made preferably of saw blade steel or other material having elastic qualities. The fingers 63 are curved downwardly as shown in Figure 9, in their normal position.

A screw $62^a$ is passed through the fingers 63 and the block 62 and is threaded into the lower end of the shaft 61 in order to hold the parts firmly together.

It may be explained at this point that it is very important that the bottom of the kettle be kept absolutely clean in order that the grains of corn may not burn and stick thereto.

In order to do this, it is necessary to have a positive contact between all portions of the stirring fingers and the bottom of the kettle. I am aware that stirring mechanisms similar to the one that I have just described, have already been produced. However, in each case the stirring fingers are made of some rigid inflexible material and they invariably become bent slightly out of shape when they will no longer conform to the bottom of the kettle.

If the bottom of the kettle or the fingers become worn unevenly, they will separate at places and thus the close contact will be lost.

A collar $63^a$ is provided on the shaft 61 and the set screw 64 holds it in place thereon. The collar $63^a$ is designed to rest against the lower edge of the hub 60 and when in the correct position it will hold the fingers 63 flattened out against the bottom of the kettle. If the fingers become worn, the position of the collar 63ª may be changed slightly so as to retain the position against the bottom of the kettle.

It will be seen that by providing fingers which are normally curved and which are designed to be flattened out against the bottom of the kettle, a positive contact between the fingers and the kettle is assured, thus each particle of corn will be swept clean of the bottom, as the stirring mechanism is revolved and it will not be possible for any of the ingredients to get under the fingers and adhere to the bottom. This will prevent any possibility of burning the corn.

A crank handle 65 having a knob 66 is provided for rotating the stirring mechanism.

The cover members 67 are hinged to the plate 58 by means of the hinges 68 and serve to enclose the corn while it is popping. When it is desired to pour the popped corn from the kettle either of the cover members 67 may be lifted.

My pop corn kettle may be supported in any convenient manner over a burner, while popping the corn. When the corn is popped one of the lids 67 may be opened and the popped corn poured out.

It will be seen that I have provided a very simple and inexpensive pop corn kettle which may be used in a pop corn machine or over a stove or the like.

Such changes may be made in the construction and arrangement of the various parts of my pop corn kettle as do not depart from the real spirit and purpose of my invention and it is my intention to cover by my claim, any modified forms of structure or use of mechanical equivalents, which may be reasonably included within its scope.

I claim as my invention:

A pop corn kettle having a plate detachably secured to the top thereof, an elongated bearing formed at the center of said plate, a shaft extending through said bearing and having a crank on its upper end, and resilient, normally bowed stirrer blades on its lower end, means for detachably securing said stirrer blades to the lower end thereof, said means comprising a sleeve fitting over the lower end of said shaft, grooves in the end of said sleeve for receiving said stirrer blades, said blades having openings at their center for receiving a screw, a registering opening in said sleeve, and a registering screw-threaded opening in said shaft, a screw extending through all of said openings and screwed into said shaft for firmly clamping said stirrer blades and sleeve to said shaft.

Des Moines, Iowa, September 6, 1922.

WILLIAM H. KRIETE.